United States Patent
Grier

[11] 3,880,924
[45] Apr. 29, 1975

[54] 3-(SUBSTITUTED)-2',6'-DILOWERALKYLACRYLANILIDES

[75] Inventor: Nathaniel Grier, Englewood, N.J.

[73] Assignee: Merck & Co., Inc., Rahway, N.J.

[22] Filed: Nov. 15, 1973

[21] Appl. No.: 416,131

[52] U.S. Cl............ 260/558 P; 424/324; 260/515 R
[51] Int. Cl............................................. C07c 103/22
[58] Field of Search..................................... 260/558

[56] References Cited
FOREIGN PATENTS OR APPLICATIONS
4,514,291  5/1970  Japan................................ 260/558

OTHER PUBLICATIONS
Bose, J. Indian Chem. Soc., Vol. 31, p. 108–110, (1954).

Primary Examiner—Harry I. Moatz
Attorney, Agent, or Firm—J. Jerome Behan; Edmunde D. Riedl; Francis H. Deef

[57] ABSTRACT

Novel-3(benzoyl)-2',6'-diloweralkylacrylanilides of the formula:

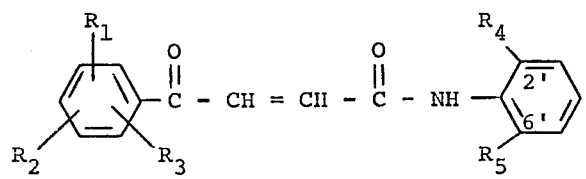

where $R_1$, $R_2$ and $R_3$ are the same or different and are hydrogen or loweralkyl; and $R_4$ and $R_5$ are the same or different and are loweralkyl are prepared by the reaction of the appropriate benzoylacrylic acid or the acid halide thereof with the appropriate 2,6-diloweralkylaniline. The resulting compounds are active antibacterial agents, and are also effective as anticoccidial agents.

4 Claims, No Drawings

3-(SUBSTITUTED)-2',6'-DILOWERALKYLACRYLANILIDES

This invention relates to new and useful 3-(benzoyl) and loweralkyl substituted 3-benzoyl-2',6'diloweralkylacrylanilides, as well as to methods for their preparation. In addition, this invention relates to novel antimicrobial agents effective against bacteria, yeast and fungi. The compounds of this invention have also been found to be effective in the prevention and treatment of coccidiosis in poultry.

Coccidiosis is a common and widespread poultry disease caused by a number of species of protozoan parasites of the genus Eimeria, including *E. tenella*, *E. necatrix*, *E. acervulina*, *E. maxima*, *E. hagani*, and *E. brunetti*. *E. tenella* is the causative agent of a severe and often fatal infection of the caeca of chickens, which is manifested by severe and extensive hemorrhage, accumulation of blood in the caeca, and the passage of blood in the droppings. *E. necatrix* attacks the small intestine of the chick causing what is known as intestinal coccidiosis. Related species of coccidia such as *E. meleagridis* and *E. adenoides* are causative organisms of coccidiosis in turkeys. When left untreated, the severe forms of coccidiosis lead to poor weight gain, reduced feed efficiency and high mortality in fowl. The elimination or control of this disease is important in order to insure protecting a valuable source of food protein.

Therefore, one object of this invention is to provide new compounds which possess coccidiostatic activity. Another object of this invention is to provide coccidiostatic compounds especially active against the species *E. tenella*. Still another object is to provide processes for the preparation of said compounds. Further objects will become apparent upon further reading of this description.

The compounds of this invention have the formula:

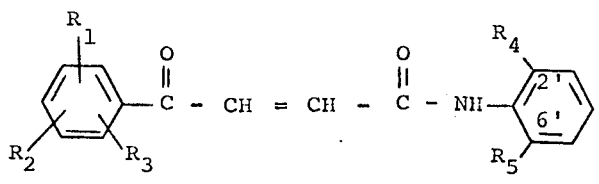

(Formula I)

In the above formula, $R_1$, $R_2$ and $R_3$ are the same or different and are hydrogen or loweralkyl, and $R_4$ and $R_5$ are the same or different and are loweralkyl. As used in this specification, the prefix "lower" is meant to include groups having from 1 to 4 carbon atoms, e.g. methyl, ethyl, propyl, and butyl, including the various isomers of propyl and butyl.

In Cramer, Journal of the American Pharmaceutical Association, 37:439 (1948) there are suggested certain benzoylacrylanilides as antimicrobial agents. The prior art teachings emphasize, however, that the 3-benzoyl moiety of the 3-benzoylacrylanilide is preferably substituted in the 2,6-positions while equally emphasizing that the anilide moiety should either be unsubstituted, or substituted only in the 4-position. The possibility and advantages of employing a hindered substitution about the anilide nitrogen, e.g., in the 2',6'-positions is completely ignored.

Surprisingly, it has now been found that the 3-benzoyl groups may either be free of substitution or can be loweralkyl substituted, but that hindrance of the 2',6'-positions of the anilide gives compounds that are highly effective not only as antimicrobial agents, but also as coccidiostats.

One possible theory which may serve to explain this unexpected activity against microorganisms and the surprising anticoccidial activity is the imparting of steric hindrance to the anilide moiety, thereby achieving linearity for the activated unsaturated system. Without such hindrance, the compounds prefer a cyclic form whereby the 3-benzoyl group becomes a carbinol equivalent. The most effective sites for preventing this cyclization appear now to be on the carbons vicinal to the amide function.

Compounds which are representative of this invention include:
3-(Benzoyl)-2',6'-diisopropylacrylanilide,
3-(Benzoyl)-2',6'-dimethylacrylanilide,
3-(Benzoyl)-2',6'-diethylacrylanilide,
3-(3-Toluyl)-2',6'-dimethylacrylanilide,
3-(4-Toluyl)-2',6'-dimethylacrylanilide,
3-(4-Isopropylbenzoyl)-2',6'-dimethylacrylanilide,
3-(2,4,6-triisopropylbenzoyl)-2',6'-dimethylacrylanilide,
3-(3,4-Xyloyl)-2',6'-diethylacrylanilide,
3-(3,5-Xyloyl)-2'-methyl-6'-ethylacrylanilide,
3-(3,5-Di-t-butylbenzoyl)-2',6'-dimethylacrylanilide,
3-(3,4,6-Mesitoyl)-2',6'-dimethylacrylanilide, and the like.

As described more fully below, these anticoccidial compounds are prepared by the reaction of the appropriately substituted benzoylacrylic acid,

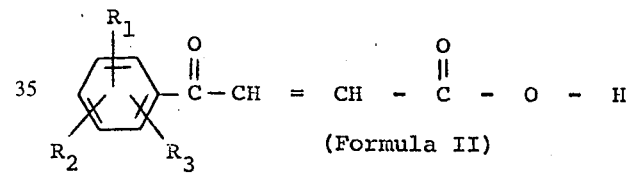

(Formula II)

where $R_1$, $R_2$ and $R_3$ are as previously defined, with an appropriate aniline derivative, of the formula

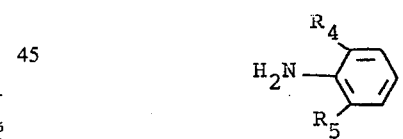

where $R_4$ and $R_5$ are as previously defined, in the presence of a coupling reagent such as dicyclohexylcarbodiimide, phosphorous oxychloride/triethylamine complex, and the like.

The acrylanilides of this invention have antimicrobial properties which can advantageously be employed by the inclusion of such compounds in formulations which are used to wash or rinse surfaces such as floors, walls, laboratory benches and the like, to render the cleansed surfaces free from susceptible organisms, e.g. *Staphylococcus aureus*. When so employing the compounds of this invention, it is dissolved or dispersed in an aqueous media at a concentration of from 10 to 200 parts per million. When an improved dispersion of the benzoylacrylanilide is desired, it can be obtained by including an anionic or nonionic surface active agent such as an alkylaryl sulfonate or the like in the aqueous media. Cationic surface active agents can also be employed. In general, surface active agents are included so as to comprise from 0.05 to 1.0 percent by weight of the aqueous media.

As heretofore stated, it has now been found that the benzoylacrylanilides of this invention are highly active against protozoa responsible for coccidiosis, and hence are particularly useful in treating and preventing coccidiosis when administered to poultry. The active compounds are conveniently fed to poultry as a component of the feed of the animals although it may also be given dissolved or suspended in the drinking water. Although the compounds of this invention are effective against the many species of *Eimeria*, they are especially effective against *E. tenella*.

According to a preferred aspect of this invention, novel compositions for the treatment of coccidiosis are provided which comprises one or more substituted benzoylacrylanilides intimately dispersed in or intimately admixed with an inert edible carrier or diluent. By an inert edible carrier or diluent is meant one that is nonreactive with respect to the benzoylacrylanilide compound, and that may be administered with safety to the animals to be treated. The carrier or diluent is preferably one that is or may be an ingredient of the animal feed.

Very low levels of benzoylacrylanilide compounds in the ultimate feed are sufficient to afford the poultry good protection against coccidiosis. Suitably the compound is administered to chickens in an amount equal to about 0.0005 to 0.10 percent by weight of the daily feed intake. Preferred results are obtained by feeding at a level of about 0.001 to 0.05 percent by weight of the finished feed, and most preferably at a level of 0.0125 to 0.05 percent by weight. For therapeutic treatment of an established coccidial infection, higher amounts of substituted benzoylacrylanilides, i.e., up to about 0.1% by weight of the feed consumed, may be employed. The most advantageous dosage level will, of course, vary somewhat with particular circumstances such as the type and severity of the coccidial infection to be treated and the likelihood of reinfection.

The anti-microbial and anti-coccidial agents of this invention are prepared by reacting the appropriately substituted benzoylacrylic acid with the appropriately substituted aniline in the presence of a coupling reagent. Most suitably, the benzoylacrylanilide is prepared by reaction of a solution of the corresponding benzoylacrylic acid and substituted aniline with phosphorous oxychloride/triethylamine complex. The complex is best prepared in situ. The preferred procedure involves treating a tetrahydrofuran solution of one equivalent of the substituted benzoylacrylic acid and one equivalent of the substituted aniline with one equivalent of phosphorous oxychloride followed by the addition of two equivalents of triethylamine.

Of the starting materials used for preparing the compounds of this invention, the substituted aniline compounds are known.

Benzoylacrylic acid is also known, and the substituted benzoyl acrylic acids can be prepared from the appropriately substituted benzene by condensation with maleic anhydride. This reaction is performed by standard techniques utilized in conducting a Friedel-Crafts condensation employing the usual Lewis acid catalyst such as aluminum chloride as outlined in Papa, Journal of the American Chemical Society, 70:3356 (1948), and Cramer, Journal of the American Pharmaceutical Association, 37:439 (1948).

When preparing substituted benzoylacrylic acids where the substituents present on the benzene reactant would tend to hinder its condensation with the maleic anhydride, it is preferable to employ the following preparative method. The substituted benzene is reacted with dichloroacetyl chloride, employing at least an equivalent amount of the dichloroacetyl chloride. The reactants are admixed in the presence of a Lewis acid catalyst, such as, aluminum chloride. After reaction at 50°C. to 90°C. for a period of from 3–10 hours, the substituted acetophenone is isolated. This is in turn reacted with an alkali alkoxide suitably sodium methoxide in a suitable solvent such as methyl alcohol at room temperature. By suitable solvent is meant one which does not react irreversibly with reactants as products. After about two hours, the reaction is generally complete and the dialkoxy derivative isolated. Upon treatment with acid, the glyoxal hydrate is obtained and reacted by condensation with malonic acid followed by decarboxylation thereby forming the desired substituted benzoylacrylic acid. When preparing substituted benzoylacrylic acids where the substituents present on the benzene reactant would prevent condensation with maleic anhydride or produce an undesirable isomer of the substituted benzoylacrylic acid, it is preferable to employ the following preparative procedure. The corresponding substituted acetophenone in aqueous acetic acid is oxidized with an equivalent amount of selenium dioxide ($SeO_2$) at 50°C. to 150°C. for ½ to 3 hours. The corresponding substituted phenyl glyoxal hydrate is isolated and converted to the benzoylacrylic acid as described above.

The following examples are set forth to illustrate the invention and are not to be construed as limitations thereon.

EXAMPLE 1

3-(Benzoyl)-2',6'-dimethylacrylanilide

There is dissoved in 25 ml. of tetrahydrofuran 1.8 g. of benzoylacrylic acid followed by the addition of 1.2 g. of 2,6-dimethylaniline. To the reaction mixture is then added 2.2 g. of dicyclohexylcarbodiimide. The resulting clear solution is agitated for 2 hours. A precipitate forms during this period and this precipitate removed by filtration and then washed with tetrahydrofuran. After drying under vacuum there is obtained 0.9 g. of N,N'-dicyclohexylurea.

The filtrate from the above procedure is treated with 2 ml. of glacial acetic acid and then allowed to stand for one-half hour at room temperature to convert any unreacted dicyclohexylcarbodiimide to dicyclohexylurea. The solution is then again filtered and the filtrate stripped under vacuum. The residue is dissolved in 700 ml. benzene and washed with 188 ml. of cold one normal HCl followed by a wash with an equal volume of water and then an equal volume of aqueous 5 percent sodium bicarbonate. The benzene solution is dried over anhydrous magnesium sulfate, filtered and stripped under vacuum. The residue is dissolved in hot benzene and crystallized. There is obtained 0.4 g. of 3-(benzoyl)-2',6'-dimethylacrylanilide having a melting point of 209°C. – 211°C.

In a procedure analagous to that of Example 1, but substituting in place of the 2,6-dimethylaniline an equivalent amount of 2,6-diisopropylaniline or 2,6-diethylaniline, there is obtained 3-(benzoyl)-2',6'- diisopropylacrylanilide, and 3-(benzoyl)-2',6'-diethylacrylanilide.

EXAMPLE 2

3-(2,4,6-Mesitoyl)-2',6'-dimethylacrylanilide

In 25 ml. of tetrahydrofuran there is dissolved 2.2 g. of 3-(2,4,6-mesitoyl)acrylic acid and 1.2 g. of 2,6-dimethylaniline is added to the reaction mixture followed by addition of 2.2 g. of dicyclohexylcarbodiimide. A gradual precipitation occurs and after 2 hours the reaction mixture is filtered by suction. The solution is treated with 2 ml. of glacial acetic acid for 15 minutes, filtered and the filtrate is stripped under reduced pressure and the residue dissolved in 500 ml. benzene. The solution is then washed with 90 ml. of 1/10 normal HCl followed by 90 ml. of water, and finally 90 ml. of aqueous 5 percent sodium bicarbonate. The benzene solution after filtration is dried under magnesium sulfate, and stripped to dryness. A 0.7 g. aliquot of the residue is dissolved in 10 ml. benzene and crystallized. There is obtained 0.25 g. of 3-(2,4,6-mesitoyl)-2',6'-dimethylacrylanilide having a melting point of 190°C. – 192°C.

In a manner analogous to that of Example 2, but substituting an equivalent amount of
3-(3-toluyl)acrylic acid,
3-(4-toluyl)acrylic acid,
3-(4-isopropylbenzoyl)acrylic acid,
3-(2,4,6-triisopropylbenzoyl)acrylic acid, and
3-(3,5-di-t-butylbenzoylacrylic acid, respectively for the 3-(2,4,6-mesitoyl)acrylic acid and employing an analogous quantity of 2,6-dimethylaniline, there is obtained
3-(3-toluyl)-2',6'-dimethylacrylanilide,
3-(4-toluyl)-2',6'-dimethylacrylanilide,
3-(4-isopropylbenzoyl)-2',6'-dimethylacrylanilide,
3-(2,4,6-triisopropylbenzoyl)-2',6'-dimethylacrylanilide,
and
3-(2,5-di-t-butylbenzoyl)-2',6'-dimethylacrylanilide, respectively.

In addition, employing respectively an analogous quantity of
3-(3,4-xyloyl)acrylic acid, and
3-(3,5-xyloyl)acrylic acid, in place of the 3-(2,4,6-mesitoyl)acrylic acid, and employing an analogous quantity of 2,6-diethylaniline and 2-methyl-6-ethylaniline respectively in place of the 2,6-dimethylaniline, there is obtained
3-(3,4-xyloyl)-2',6'-diethylacrylanilide and
3-(3,5-xyloyl)-2'-methyl-6'-ethylacrylanilide.

Now having described this invention, it will be understood that any departure from the above description which conforms to the invention is intended to be included within the scope of the claims.

What is claimed is:

1. A compound of the formula:

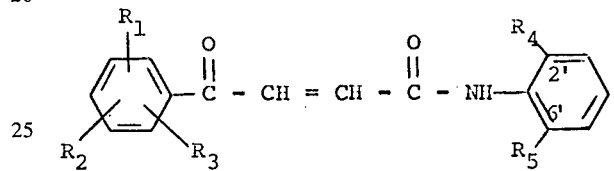

where $R_1$, $R_2$ and $R_3$ are the same or different and are hydrogen or lower alkyl; and $R_4$ and $R_5$ are the same or different and are loweralkyl.

2. A compound according to claim 1 wherein $R_1$, $R_2$ and $R_3$ are methyl.

3. A compound according to claim 1 wherein $R_1$, $R_2$ and $R_3$ are hydrogen.

4. A compound according to claim 3 wherein $R_4$ and $R_5$ are methyl.

* * * * *